July 18, 1939.                A. SCHMIDT, JR                2,166,825
                    ELECTRIC VALVE CONVERTING SYSTEM
                         Filed June 22, 1938
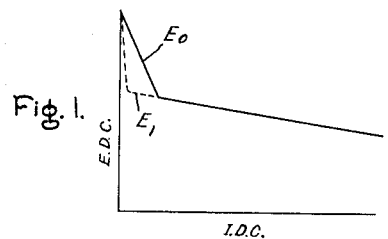
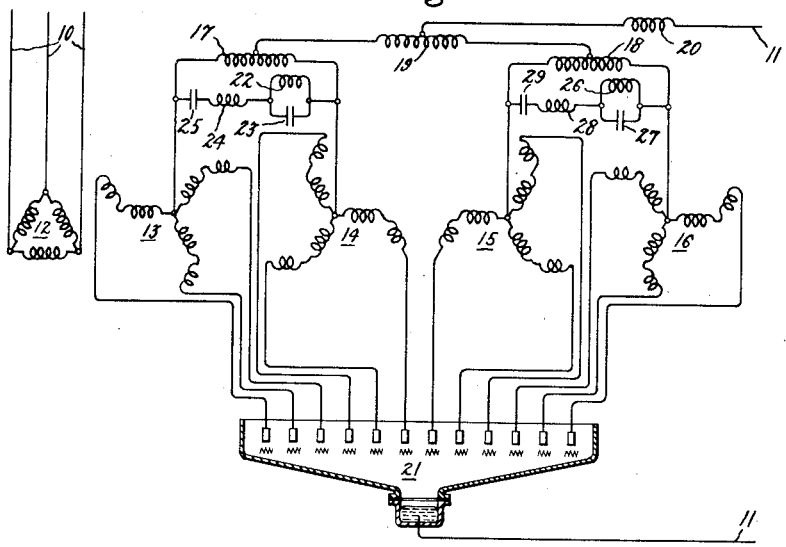
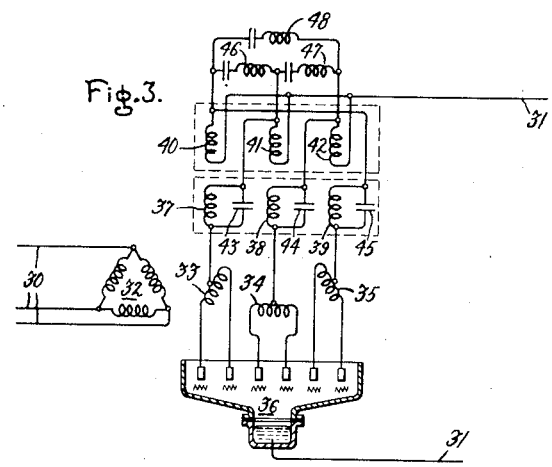
Inventor:
August Schmidt Jr.
by Harry E. Dunham
His Attorney.

Patented July 18, 1939

2,166,825

UNITED STATES PATENT OFFICE 2,166,825

ELECTRIC VALVE CONVERTING SYSTEM

August Schmidt, Jr., Niskayuna, N. Y., assignor to General Electric Company, a corporation of New York Application June 22, 1938, Serial No. 215,153

7 Claims. (Cl. 175—363)

My invention relates to electric valve converting systems and more particularly to such systems for supplying energy from an alternating current circuit to a direct current circuit.

In electric valve converting and rectifying systems it has been common to use a plurality of phase networks, the mid or neutral points of which are interconnected by means of inductive windings which have also been called interphase transformers. Such inductive windings in the instance of rectifying systems have a voltage which is a function of the load on the rectifier at light load, and which approaches a substantially constant value at heavier load values. The voltage appearing across such inductive windings is primarily that of a fundamental frequency and the lower harmonic frequencies and if some means were provided for supplying to said inductive windings a magnetizing current at light load values on the rectifying system there would be obtained better regulation of the load characteristics of the system. In other words the transition point from the normal no load characteristic to the heavier load characteristic where the effect of the interphase transformer is no longer predominant, may be changed by supplying excitation to the interphase transformers at the light load values. Heretofore there have been provided means to supply excitation to such inductive windings for interphase transformers but they have had the disadvantage of requiring an additional winding thereon. In still other arrangements the auxiliary apparatus for supplying such excitation current has the disadvantage of being quite complicated. In accordance with my invention I provide resonant circuit means for supplying excitation components of the fundamental frequency and the lower harmonic frequencies to the interphase transformers which interconnect the plurality of phase networks of the electric valve rectifying system.

It is therefore an object of my invention to provide an improved electric valve converting system for transferring energy from an alternating current circuit to a direct current circuit.

Another object of my invention is to provide an improved electric valve rectifying system wherein the inductive windings for interphase transformers may be readily supplied with magnetization current at low load values of the rectifying system.

Still another object of my invention is to provide an improved electric valve rectifying system wherein resonant circuit means are arranged to supply fundamental frequency and lower harmonic frequency components of excitation to the inductive windings or interphase transformers.

For a better understanding of my invention, together with other and further objects thereof, reference is had to the following description taken in connection with the accompanying drawing in which Fig. 1 is explanatory of the operation of my system, Fig. 2 diagrammatically illustrates the application of my invention to an electric valve rectifying system, and Fig. 3 shows another manner of applying my invention to an electric valve rectifying system.

Referring more particularly to Fig. 1 of the drawing, there is shown the load characteristics of an electric valve rectifying means and from this it is apparent that as the current I decreases the voltage E increases. The values of voltage at low load values shown by the portion of the curve $E_0$ is the voltage obtained when the ordinary interphase inductive windings or transformers are used which have no excitation current components supplied to them. The voltage values shown by the dotted curve $E_1$ is the voltage which would be obtained if this effect of the interphase transformers or inductive windings could be obviated. In accordance with my invention it is intended to reduce the transition point on the regulation characteristic curve to a lower value so that the maximum voltage appearing across the rectifier output circuit at low load values is substantially less than the value $E_0$ shown. In Fig. 2 there is shown an alternating current supply circuit 10 and a direct current circuit 11 which is interconnected by an electric valve converting system which includes the primary transformer winding 12 energized from the alternating current circuit 10, and a plurality of polyphase secondary winding networks 13 to 16. The neutral points of two of these networks 13 and 14 are interconnected by an interphase inductive winding 17; and similarly the other two polyphase networks 15 and 16 are interconnected by an interphase transformer winding 18, and the midpoints of both these inductive windings 17 and 18 are connected through another inductive winding 19 and a suitable smoothing reactor 20 to one side of the direct current circuit 11. The outer extremities of the various polyphase secondary networks 13 to 16 are interconnected with the other side of the direct current circuit 11 by a plurality of arc discharge paths or valves which may comprise valve means of the single cathode, multi-anode type and which may, if desired, be provided with suitable control electrodes. While for the purposes of illustration the group of arc discharge paths 21 has been shown as comprising a single cathode, multi-anode arc discharge device, it will of course be understood that any other valve common in the art may be utilized although it is preferable to use valves having an anode and a cathode enclosed within an envelope containing an ionizable medium and which may be provided with a control electrode. Each of the interphase inductive windings or transformers which interconnect the neutral points of a pair of the secondary windings is provided with resonant circuits which supply thereto excitation components of the fundamental frequency and one or more of the lower harmonic frequencies.

Since the exciting currents at frequencies higher than the second harmonic frequency are usually relatively small their effect may be neglected and a filter circuit containing capacitors and inductive elements is connected across the interphase inductive windings to supply thereto excitation components of the fundamental frequency and the second harmonic. Such circuits may comprise an inductor 22 in parallel with the capacitor 23 connected in series with an inductor 24 and a capacitor 25 across the interphase winding 17. These circuits have a capacitive impedance which is equal to the inductive impedance of the winding 17 at the fundamental and second harmonic frequencies. The resultant impedance of these circuits and the interphase transformer is an inductive impedance at all higher frequencies which produces a lower transition point than if the resultant impedance were capacitive. A similar circuit comprising an inductor 26 in parallel with the capacitor 27 is connected in series with the inductor 28 and a capacitor 29 so as to supply similar excitation components to the other inductive interphase winding 18. These filter elements are so designed that their capacitive impedance at these two frequencies is equal to the inductive impedance of the interphase transformer.

Since the operation of electric valve converting systems of this type is so well known by those skilled in the art, it is believed to be sufficient to state that the various arc discharge paths of the valve means 21 are rendered conductive in proper sequence due to the voltages appearing across the various polyphase secondary network windings 13 to 16 so that direct current is supplied to the load circuit 11. The interphase transformers 17 and 18 function in the usual manner under the heavier load conditions on the output circuit of the rectifier, but at the lighter load conditions the resonant circuits in parallel therewith supply to these inductive windings sufficient excitation components so as to materially reduce the voltage rise which would occur at light load values of the rectifier if no excitation were supplied. Thus it will be apparent that the load regulation characteristic is greatly improved.

Another example of the application of my invention is shown in Fig. 3 which shows an alternating current supply circuit 30 and a direct current circuit 31 which is interconnected by an electric valve converting means including a primary winding 32 and a plurality of bi-phase windings 33, 34 and 35 each of which is provided with a neutral point. The outer extremities of the secondary windings are interconnected with one side of the direct current circuit 31 by a group of valves 36 which may be any of the types well known in the art or may be as shown of the multi-anode, single cathode type. The neutral points of the secondary windings 33, 34 and 35 are interconnected to the other side of the direct current circuit by means of two groups of inductive windings or interphase transformers 37, 38, 39 and 40, 41, 42, which are arranged in series relation to each other. One group of inductive windings 37, 38, 39 is arranged on a unitary core structure and each of the windings has a capacitor connected in parallel thereto which has a value such that a harmonic component of excitation current is supplied to these windings and which component is preferably the second harmonic. The remaining interphase windings 40, 41 and 42 are also arranged on a unitary core structure and since they are all connected to one side of the direct current circuit 31 they are arranged in star relation. Across the outer extremities of this star-connected group of windings there is provided a delta group of filter circuits 46, 47 and 48 each comprising a capacitor and an inductor connected in series and having such a value as to supply to this group of interphase windings excitation current of a fundamental frequency. From this it will be apparent that the interphase windings may be divided up into a plurality of parts or groups of windings each part or group being provided with some means for supplying thereto one of the components of the excitation current which it is desired to supply thereto at low load values of the electric valve rectifying system. While each of the circuits 46, 47 and 48 have been shown as arranged in delta formation they may be arranged in star relation or in parallel to the interphase transformer windings 40, 41 and 42.

While I have shown and described my invention in connection with certain specific embodiments it will, of course, be understood that I do not wish to be limited thereto, since it is apparent that the principles herein disclosed are susceptible of numerous other applications, and modifications may be made in the circuit arrangement and in the instrumentalities employed without departing from the spirit and scope of my invention as set forth in the appended claims.

What I claim as new and desire to secure by Letters Patent of the United States is:

1. In combination, a source of alternating current, a load circuit, an electric valve converting system interconnecting said circuit, said system including a plurality of polyphase networks each provided with a neutral point, a plurality of inductive windings interconnecting said neutral points, and resonant circuit means connected to said latter inductive windings for supplying thereto excitation components of a plurality of frequencies.

2. In combination, an alternating current supply source, a direct current load circuit, an electric valve converting system interconnecting said circuits, said system including a plurality of polyphase networks each provided with a neutral point, interphase inductive windings interconnecting said neutral points with one side of said direct current circuit, and resonant circuit means connected to each of said interphase inductive windings for supplying thereto fundamental and second harmonic frequency excitation current components.

3. In combination, an alternating current supply circuit, a direct current load circuit, an electric valve converting system interconnecting said circuits, said system including a plurality of polyphase inductive windings each provided with a neutral point, interphase inductive windings interconnecting said neutral points, and resonant circuit means connected to each of said interphase windings for supplying thereto fundamental and second harmonic frequency excitation components.

4. In combination, an alternating current source, a direct current load circuit, an electric valve converting means interconnecting said circuits, said means comprising a plurality of polyphase inductive windings each provided with a neutral point, two groups of interphase inductive windings connecting said neutral points to one side of said direct current circuit, and means associated with said one group of interphase inductive windings for supplying thereto a fundamental frequency excitation component, and means associated with the other of said groups of interphase inductive windings for supplying thereto a second harmonic frequency excitation component.

5. The combination comprising an alternating current source, a direct current load circuit, an electric valve converting means interconnecting said circuits, said means including a plurality of polyphase inductive windings each provided with a neutral point, a plurality of serially connected interphase transformers connecting said neutral points to one side of said direct current circuit, and resonant circuit means associated with one of said interphase transformers for supplying thereto a fundamental frequency excitation component, and resonant circuit means associated with each of said other interphase transformers for supplying thereto the next higher harmonic frequency excitation component.

6. The combination comprising a source of alternating current, a direct current load circuit, an electric valve converting system interconnecting said circuits, said system including two groups of polyphase windings each comprising two star-connected networks, an interphase transformer for each of said groups for interconnecting the neutral points of said polyphase networks with one side of said direct current circuit, and resonant circuit means connected across each of said interphase transformers for supplying thereto a fundamental frequency excitation component and a low harmonic frequency excitation component.

7. The combination comprising a source of alternating current, a direct current load circuit, an electric valve converting system interconnecting said circuits, said system including two groups of polyphase windings each provided with neutral points, and each of said groups comprising a pair of inductive windings, an interphase transformer interconnecting the neutral points of a pair of said inductive windings, an impedance means connected across said interphase transformer, said impedance means being arranged to have a capacitive impedance equal to the inductive impedance of said transformer at the fundamental and second harmonic frequencies, and said transformer and impedance having a resultant impedance which is inductive at all higher frequencies.

AUGUST SCHMIDT, Jr.